United States Patent
Yokomori et al.

(10) Patent No.: US 7,334,498 B2
(45) Date of Patent: Feb. 26, 2008

(54) TENSION DEVICE FOR PRODUCING AN INITIAL TENSION ON A WIRE CABLE

(75) Inventors: Kazuhito Yokomori, Yamanashi-ken (JP); Shoji Wakatsuki, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/252,116

(22) Filed: Sep. 23, 2002

(65) Prior Publication Data

US 2004/0016181 A1    Jan. 29, 2004

(30) Foreign Application Priority Data

Sep. 21, 2001    (JP)    .............................. 2001-288571

(51) Int. Cl.
*F16C 1/22*    (2006.01)

(52) U.S. Cl. ..................... 74/502.4; 74/502.6; 254/231; 49/352

(58) Field of Classification Search .................. 49/352, 49/360; 254/231, 234, 233; 403/319, 320; 74/502.4, 502.6
See application file for complete search history.

(56) References Cited

U.S. PATENT DOCUMENTS

| | | | |
|---|---|---|---|
| 4,727,681 A * | 3/1988 | Kinoshita et al. ............. 49/352 |
| 5,207,116 A * | 5/1993 | Sultze ........................ 74/502.4 |
| 5,598,743 A * | 2/1997 | Yasuda ....................... 74/502.4 |
| 5,664,462 A * | 9/1997 | Reasoner .................... 74/502.4 |
| 5,682,797 A * | 11/1997 | Kelley et al. .............. 74/502.4 |
| 5,737,875 A | 4/1998 | Dowling et al. |
| 5,749,174 A * | 5/1998 | Mariel ......................... 49/352 |
| 5,884,433 A | 3/1999 | Watanabe et al. |
| 5,953,963 A * | 9/1999 | Wirsing et al. ............ 74/502.4 |
| 6,085,610 A * | 7/2000 | Gabas et al. ........... 74/501.5 R |
| 6,131,482 A * | 10/2000 | Klippert et al. ............ 74/502.6 |
| 6,198,242 B1 | 3/2001 | Yokomori et al. |
| 6,202,351 B1 * | 3/2001 | Medebach .................... 49/352 |
| 6,216,555 B1 * | 4/2001 | Malone ...................... 74/502.6 |

* cited by examiner

*Primary Examiner*—Gregory J. Strimbu
(74) *Attorney, Agent, or Firm*—Browdy and Neimark, PLLC (57) ABSTRACT

An initial tension device has a wire cable for connecting a drive unit and a movable member, a tension case fixed to an immovable member, a regular retainer engageable with an outer cable of the wire cable, and a slot formed in the tension case to extend in the longitudinal direction of the wire cable. The regular retainer engaged with the outer cable moves together with the outer cable by the tension applied to the wire cable through the length defined by the slot. The regular retainer is engaged with the outer cable in the state where a maximum tension is applied to the wire cable.

6 Claims, 11 Drawing Sheets

TENSION DEVICE FOR PRODUCING AN INITIAL TENSION ON A WIRE CABLE

FIELD OF THE INVENTION

The present invention relates to a device for applying an initial tension to a wire cable which transmits the driving power of a drive unit represented by a powered slide unit for a vehicle slide door, to a movable member represented by the slide door, and furthermore, relates to a method of applying an initial tension to a wire cable.

DESCRIPTION OF THE RELATED ART

U.S. Pat. No. 5,884,433 discloses a device for applying the initial tension to a wire cable which transmits the driving power of a powered slide unit to a slide door.

This conventional tension device has two disadvantages to be solved. The first one is that the tension device is attached to the main body of the powered slide unit. Usually, the place where the main body can be attached is a place at which the access for adjusting the initial tension cannot easily get.

Second one is that it is very difficult to accurately set the initial tension by the initial tension device. In the case of the conventional device, the wire cable is gradually tensed until a proper tension of the cable is obtained, but it has been difficult to know the timing when the initial tension of the wire cable becomes the proper value, if a tool such as a level gage is not used.

Furthermore, U.S. Pat. No. 5,737,875 also discloses a device for applying the initial tension to a wire cable which transmits the driving power of a powered slide unit to a slide door. The second conventional device is set at a place where the workability is excellent, but an accurate initial tension cannot be applied to the wire cable. That is, the second conventional device has no fine adjusting function of the initial tension.

Furthermore, a third conventional device disclosed in U.S. Pat. No. 6,198,242 also cannot apply an accurate initial tension to the wire cable.

SUMMARY OF THE INVENTION

Accordingly, it is an object of the present invention to provide an initial tension device that can apply a proper initial tension to a wire cable without using any tool such as a level gage.

Furthermore, another object of the present invention is to provide an initial tension device wherein the degree of freedom is high in the mounting position.

Furthermore, another object of the present invention is to provide a method by which a proper initial tension can easily be applied to a wire cable.

DESCRIPTION OF THE PREFERRED EMBODIMENT

Figure 1:
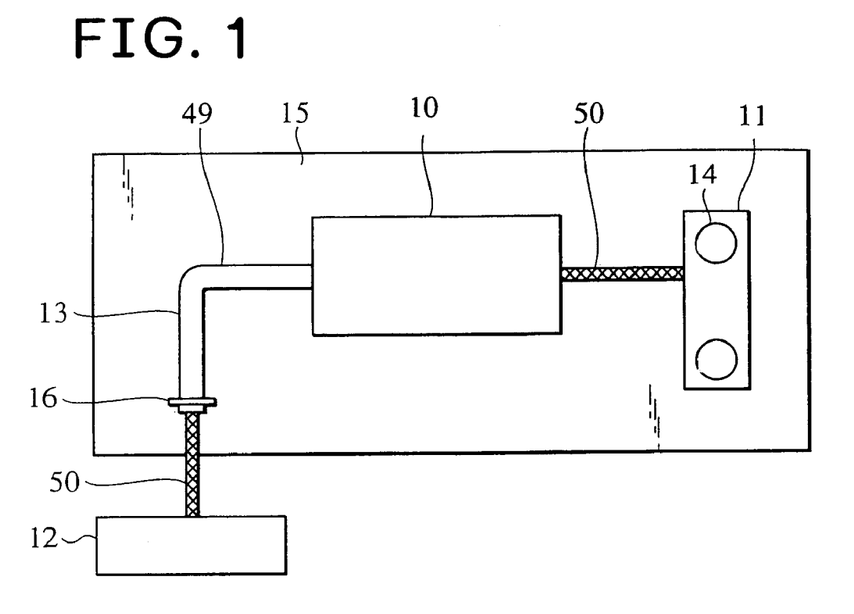
FIG. 1 is an arrangement plan of an initial tension device, a drive unit, and a movable member on the basis of an embodiment of the present invention.

A preferred embodiment of the present invention will be described while referring to the drawings. As shown in FIG. 1, an initial tension device 10 according to the present invention is arranged, for example, between a drive unit 11 represented by a powered slide unit for a vehicle slide door and a movable member 12 represented by the slide door, and applies an initial tension to a wire cable which transmits the driving power of the drive device 11 to the movable member 12. The drive device 11 has a secondary tension mechanism 14 for absorbing the slack in use of a wire cable 13 to which the initial tension is applied.

The wire cable 13 is composed of an outer cable 49 and an inner cable 50, and one end of the outer cable 49 is connected to the initial tension device 10, and the other end of the outer cable 49 is fixed to a fixing part 16 of an immovable member 15 represented, for example, by a vehicle body. The tension device 10 changes the arrangement length of the wire cable 13 by moving the position of one end of the outer cable 49, and applies an initial tension to the inner cable 50.

Figure 2:
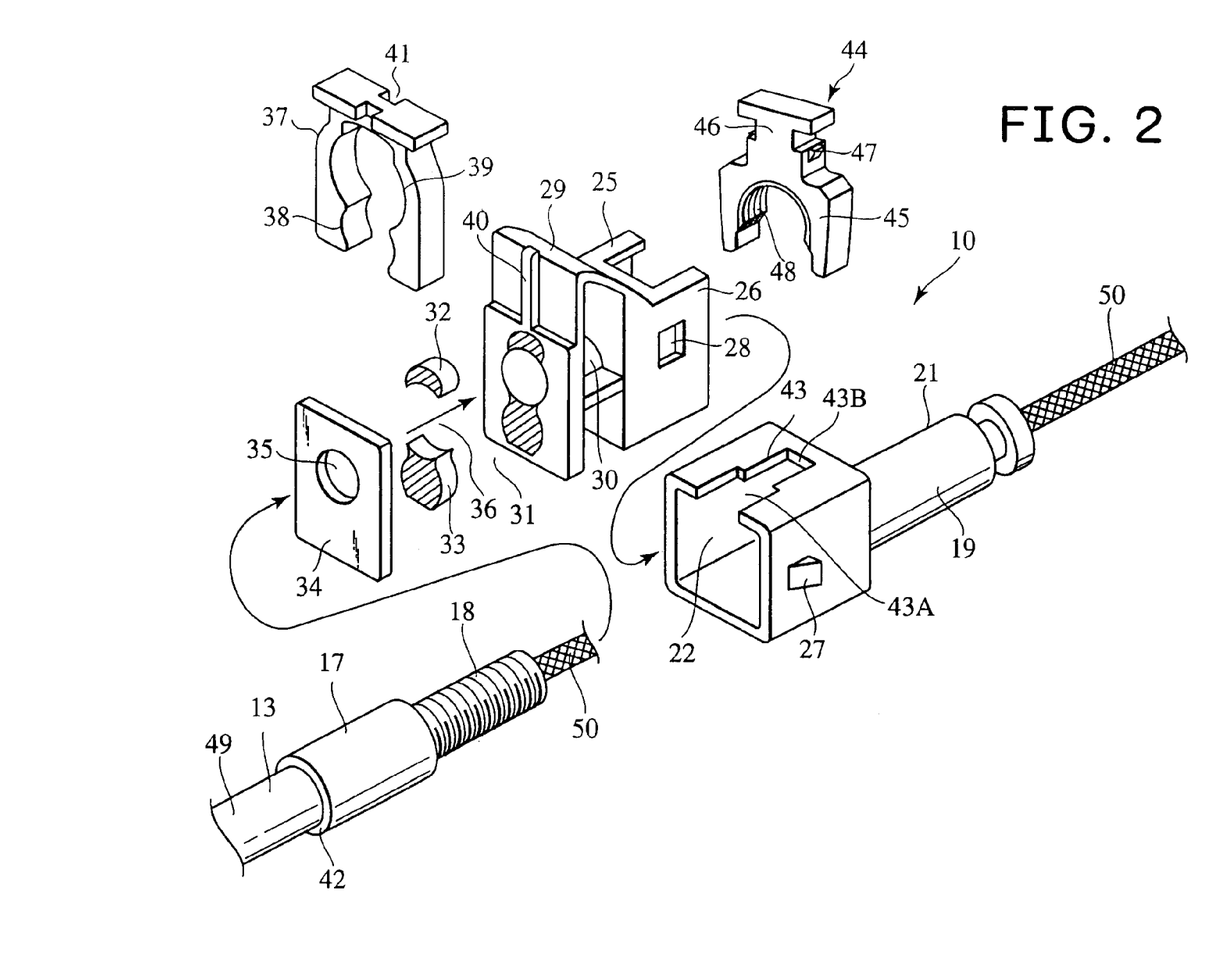
FIG. 2 is an exploded perspective illustration of the initial tension device.

As shown in FIG. 2, at one end of the outer cable 49, a large diameter cylindrical insertion part 17 is formed, and the outer peripheral surface on the tip side of the insertion part 17 is formed to be a notched part 18 such as a screw groove.

Figure 3:
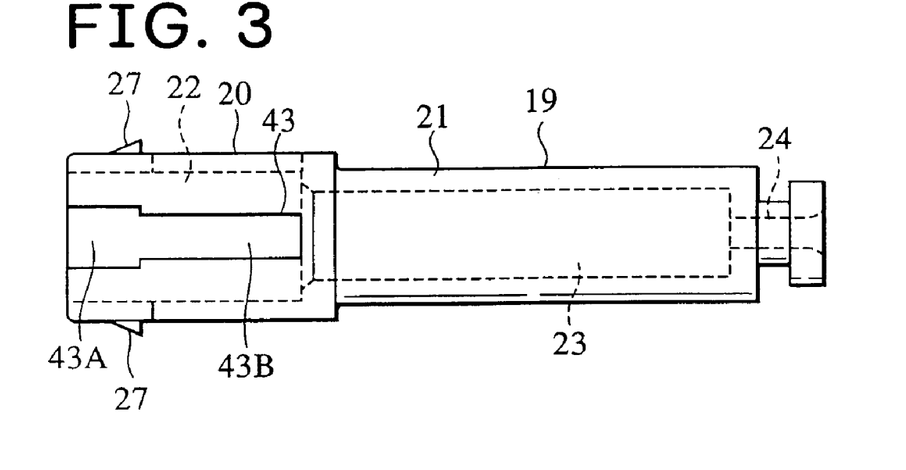
FIG. 3 is a plan view of a base case of the initial tension device.
Figure 4:
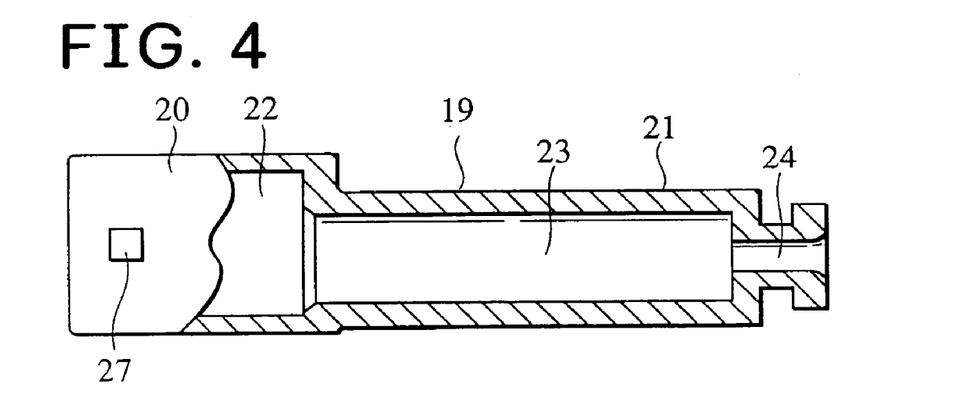
FIG. 4 is a partial vertical cross sectional view of the base case.
Figure 5:
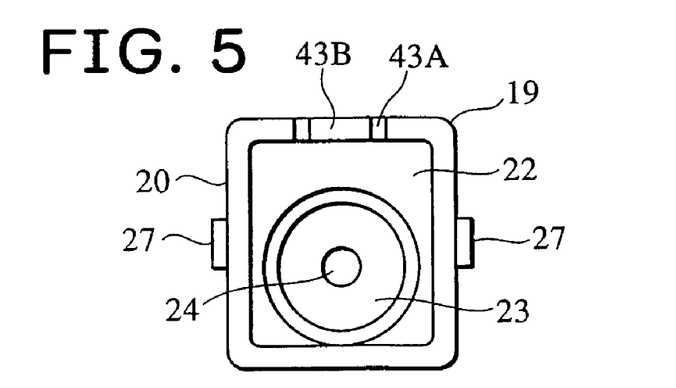
FIG. 5 is a back view of the base case.
Figure 6:
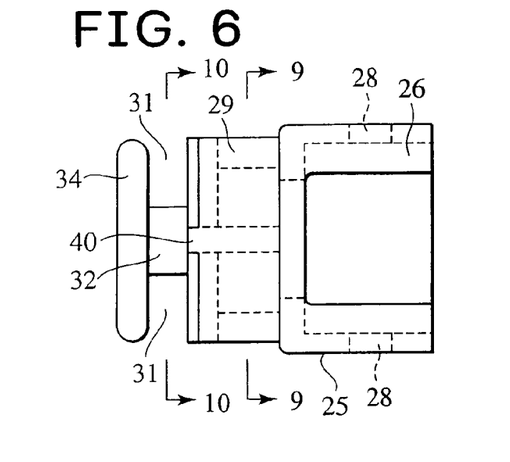
FIG. 6 is a plan view of a cover case of the initial tension device.
Figure 7:
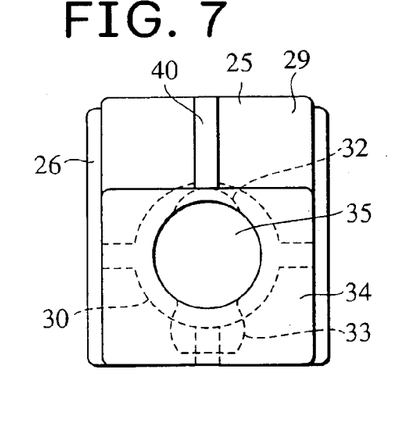
FIG. 7 is a back view of the cover case.
Figure 8:
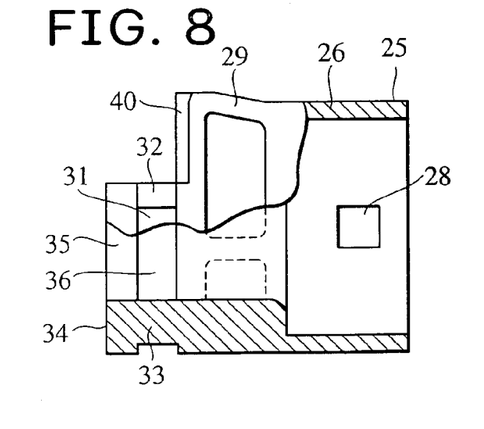
FIG. 8 is a partial vertical cross sectional view of the cover case.
Figure 9:
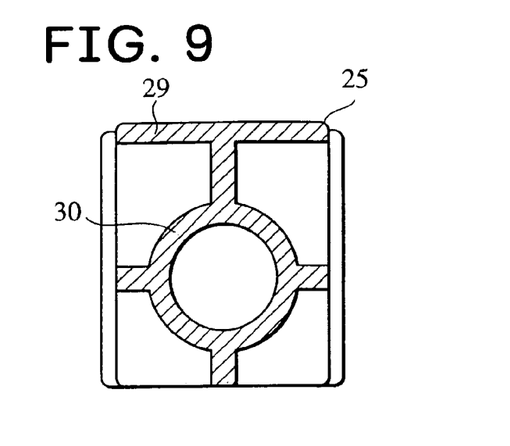
FIG. 9 is a cross sectional view of 9-9 of FIG. 6.
Figure 10:
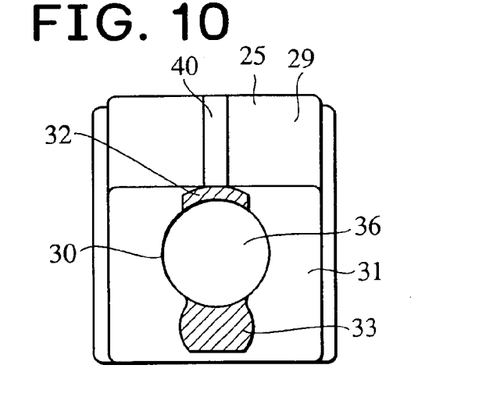
FIG. 10 is a cross sectional view of 10-10 of FIG. 6.
Figure 19:
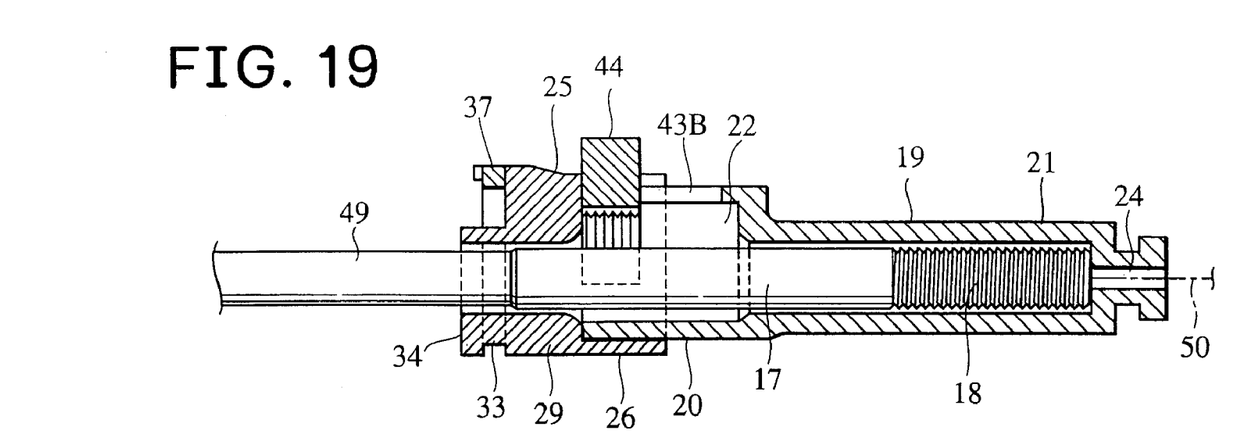
FIG. 19 is a cross sectional view showing the state where the insertion part of the outer cable is deeply inserted into the base case to loosen the tension of an inner cable.
Figure 20:
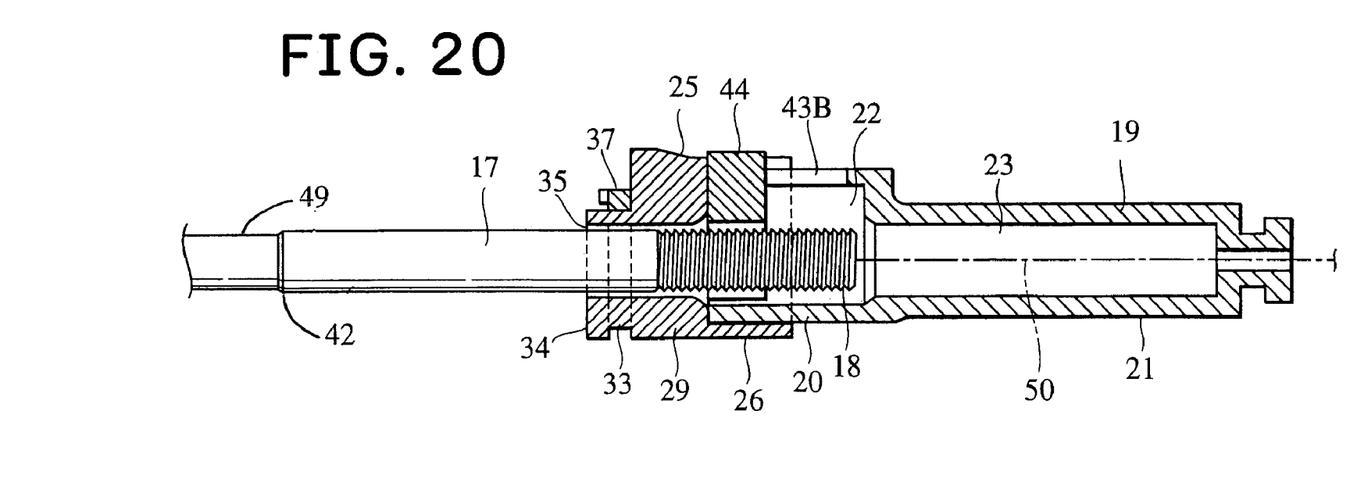
FIG. 20 is a cross sectional view showing the state where the insertion part is strongly pulled backward from the base case to make the tension of the inner cable maximum.
Figure 21:
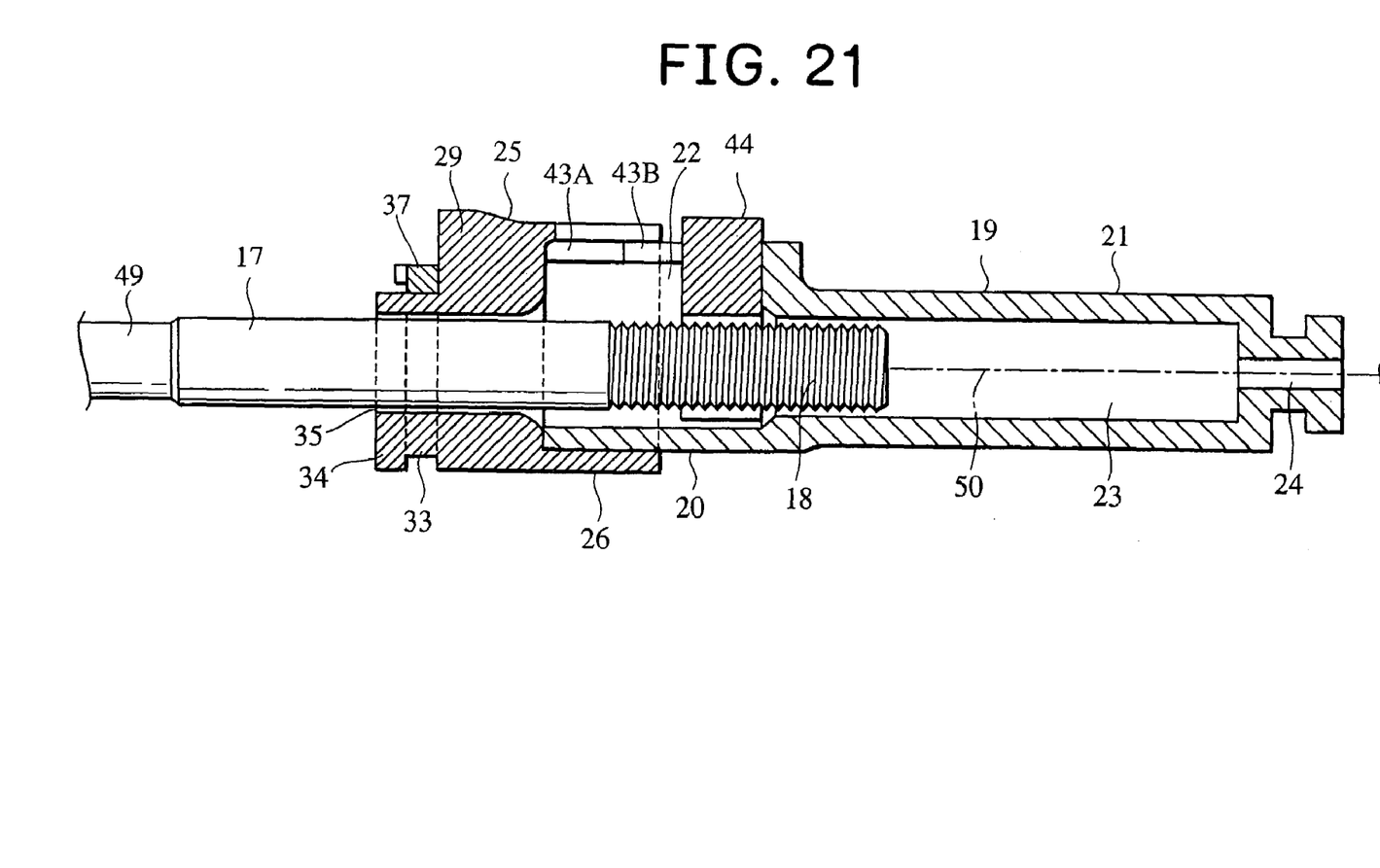
FIG. 21 is a cross sectional view showing the state where the insertion part is moved forward by a specified distance to make the tension of the inner cable proper.

The initial tension device 10 has a long hollow base case 19 (FIGS. 3 to 5) extending in parallel with the wire cable 13. The base case 19 is composed of a rear cubic part 20 and a front cylindrical part 21, and is fixed to the immovable member 15. The cubic part 20 has a wide first interior space 22 where the rear part is open, and the cylindrical part 21 has a long second interior space 23 leading to the first space 22. The insertion part 17 is inserted into the second space 23 through the first space 22 as shown in FIGS. 19 to 21, and the inner cable 50 is introduced to the front of the base case 19 through a small diameter passage 24. The insertion part 17 has a diameter a little smaller than that of the second space 23, and between the insertion part 17 and the second space 23, no substantial friction is produced. As shown in FIG. 19, when the insertion part 17 is deeply inserted into the second space 23, the arrangement length of the wire cable 13 between the fixing part 16 and the base case 19 becomes short, and the tension of the inner cable 50 becomes low, and as shown in FIG. 20, when the insertion part 17 moves toward the back of the second space 23, the arrangement length of the wire cable 13 becomes long, and the tension of the inner cable 50 becomes high.

The initial tension device 10 has a cover case 25 (FIGS. 6 to 10) to be attached to the base case 19. A hollow outside cubic part 26 of the cover case 25 is covered on the outside of the rear cubic part 20 of the base case 19, and both are fixed by engaging a hook 27 of the rear cubic part 20 with an engaging hole 28 of the outside cubic part 26.

At the rear part of the outside cubic part 26, a rear bulge part 29 as a spacer is formed. At the center of the rear bulge part 29, a tube 30 into which the insertion part 17 can be inserted is formed. When the cover case 25 is attached to the base case 19, the tube 30 is communicated with the first space 22, and the axial center of the tube 30 is aligned with the axial center of the second space 23. A flange 34 is connected to the backside of the rear bulge part 29 by two beams 32, 33, leaving a clearance 31 therebetween. The flange 34 has an insertion hole 35 aligned with the tube 30. The beam 32 is higher than the tube 30, and the beam 33 is lower than the tube 30, and between the beam 32 and 33, a passage 36 communicated with the tube 30 and the insertion hole 35 is defined.

Figure 11:
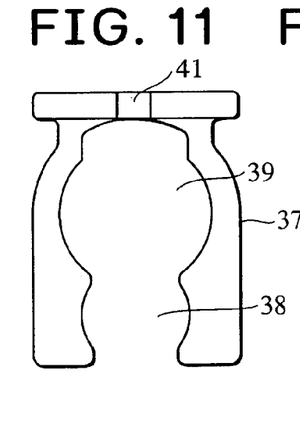
FIG. 11 is a front view of a temporary retainer of the initial tension device.
Figure 12:
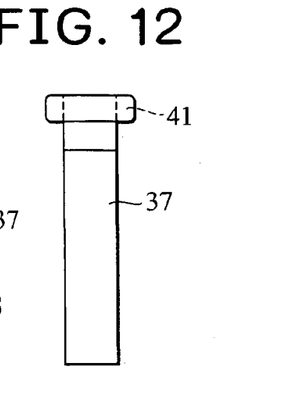
FIG. 12 is a side view of the temporary retainer.

The initial tension device 10 has a fork-like temporary snap retainer 37 (FIGS. 11, 12). The retainer 37 is inserted into the clearance 31 between the rear bulge part 29 and the flange 34. The retainer 37 has a lower engaging part 38 with a size just fitting to the outside diameter of the outer cable 49 and an upper opening part 39 with a size approximately equal to that of the insertion hole 35 and a diameter a little larger than that of the insertion part 17. Furthermore, the retainer 37 has a recess 41 fitting to a guide rail 40 formed on the rear surface of the rear bulge part 29, and the retainer 37 is guided into the clearance 31 by the sliding engagement of the guide rail 40 and the recess 41.

Figures 13, 15:
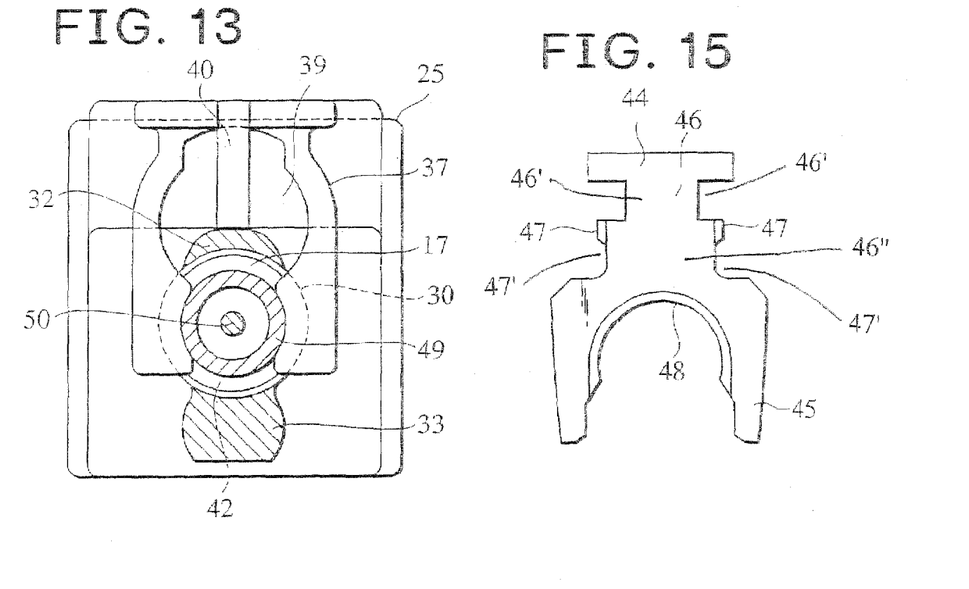
FIG. 13 is a back view showing the state where the temporary retainer is engaged with an outer cable.
FIG. 15 is a front view of a regular retainer of the initial tension device.

As shown in FIG. 19, when the insertion part 17 is made to go through the interior of the cover case 25 to be inserted deeply into the second space 23, a step part 42 at the rear end of the insertion part 17 is positioned in front of the clearance 31, and next, when the retainer 37 is inserted into the clearance 31, as shown in FIG. 13, the lower engaging part 38 of the retainer 37 is engaged with the outer periphery of the outer cable 49. In this state, the backward movement of the insertion part 17 is prevented by the contact of the step part 42 of the insertion part 17 with the lower engaging part 38, and accordingly, the tension of the inner cable 50 is kept in the low state. If the tension of the inner cable 50 is kept in the low state, the initial set-up for connecting the wire cable 13 to the drive unit 11 and the movable member 12 becomes easy.

Figure 14:
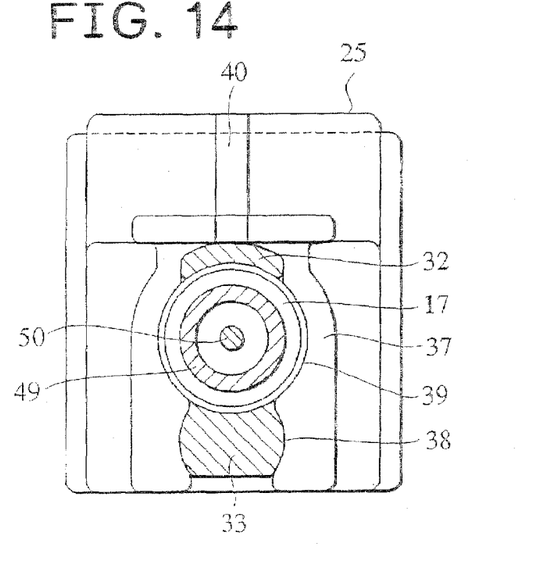
FIG. 14 is a back view showing the state where the temporary retainer of FIG. 13 is deeply inserted to cancel the engagement between the temporary retainer and the outer cable.

When the initial set-up has been finished, the retainer 37 is furthermore moved downward. Then, as shown in FIG. 14, the upper opening part 39 of the retainer 37 is aligned with the passage 36 of the clearance 31, and the prevention of the backward movement of the insertion part 17 is cancelled.

At the upper surface of the rear cubic part 20 of the base case 19, a slot 43 extending in parallel with the wire cable 13 is formed. The slot 43 is composed of a rear wide slot 43A and a coplanar front narrow slot 43B leading to the front end of the wide slot 43A.

Figure 16:
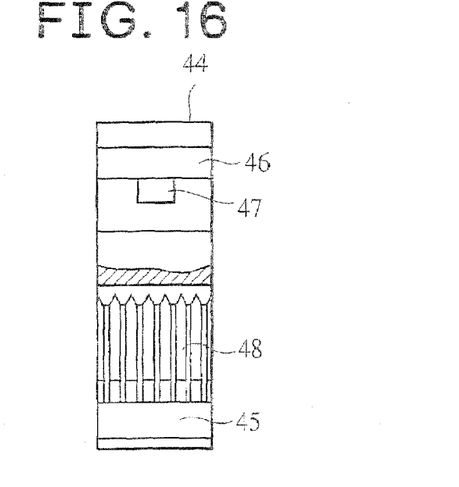
FIG. 16 is a partial vertical cross sectional view of the regular retainer.

The initial tension device 10 has a fork-like regular retainer 44 (FIGS. 15 and 16). The regular retainer 44 has a lower reverse U-shaped engaging part 45 contained in the first space 22 of the rear cubic part 20, a narrow part 46 formed by slots 46' which can go into the narrow slot 43B, and a wide part 46" having slots 47' formed at their upper edges by inclined projections 47, 47 which can be temporarily and slightly engaged with both side upper edges of the wide slot 43A. The engaging part 45 has an inside tooth part 48 which is firmly engageable with the notched part 18 of the insertion part 17.

Figure 17:
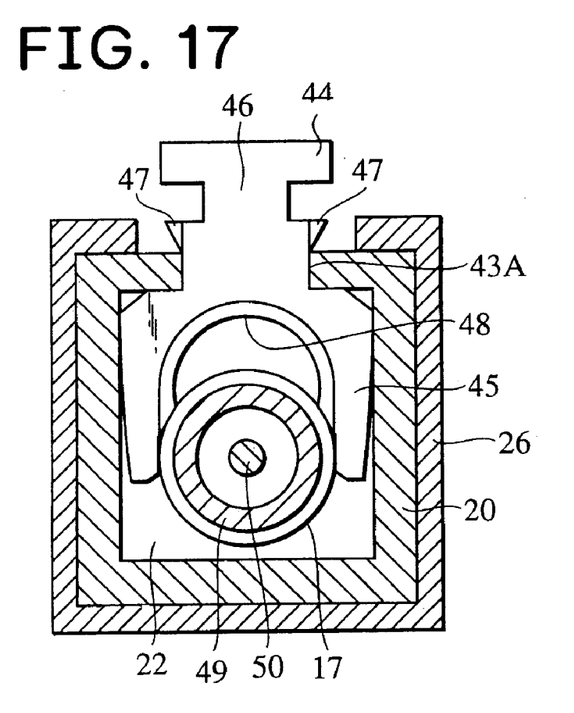
FIG. 17 is a cross sectional view showing the initial position of the regular retainer.

As shown in FIG. 17, the regular retainer 44 is kept, first, in the state where the inclined projections 47, 47 are temporarily engaged with both side upper edges of the wide slot 43A. Therefore, the inside tooth part 48 of the engaging part 45 does not prevent the insertion part 17 from sliding into the base case 19, and does not obstruct the initial setup of the wire cable 13.

When the initial set-up of the wire cable 13 has been finished, the movement restriction of the insertion part 17 by the temporary retainer 37 is cancelled, and next, the outer cable 49 is pulled backward by a force extremely stronger than the proper tension of the outer cable 13. Then, the insertion part 17 fixed to the outer cable 49 is moved backward as shown in FIG. 20, and the inner cable 50 is at its maximum extended state. When this state is made, the insertion part 17 does not substantially move backward even if the outer cable 49 is pulled backward by a stronger force. In the present invention, the tension of inner cable 50 in its maximum extended state produces the maximum tension on cable 50.

Figure 18:
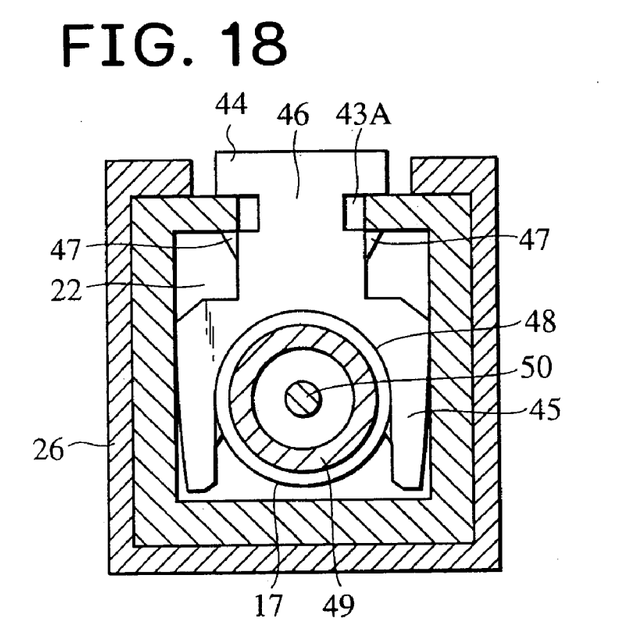
FIG. 18 is a cross sectional view showing the state where the regular retainer is engaged with a notched part of the outer cable.

After giving the maximum tension to the inner cable 50, the regular retainer 44 is pushed downward, and as shown in FIG. 18, the inside tooth part 48 of the regular retainer 44 is strongly engaged with the notched part 18 of the insertion part 17, and after that, the backward traction of the outer cable 49 is cancelled. When the regular retainer 44 is pushed downward, the narrow part 46 of the regular retainer 44 stands face to face in the state where it can go into the narrow slot 43B of the base case 19.

When the backward traction of the outer cable 49 is cancelled, the insertion part 17 moves forward by the maximum tension applied to the inner cable 50, and the narrow part 46 of the regular retainer 44 goes into the narrow slot 43B of the base case 19, and as shown in FIG. 21, when the narrow part 46 is brought into contact with the front end part of the narrow slot 43B, the insertion part 17 stops. Thus, when the insertion part 17 moves forward by the length of the narrow slot 43B, the excessive tension applied to the inner cable 50 is released, and the tension of the inner cable 50 is restored to the proper value. That is, since the length of the narrow slot 43B is fixed, a fixed slack is applied to the inner cable 50 at all times.

Figure 22:
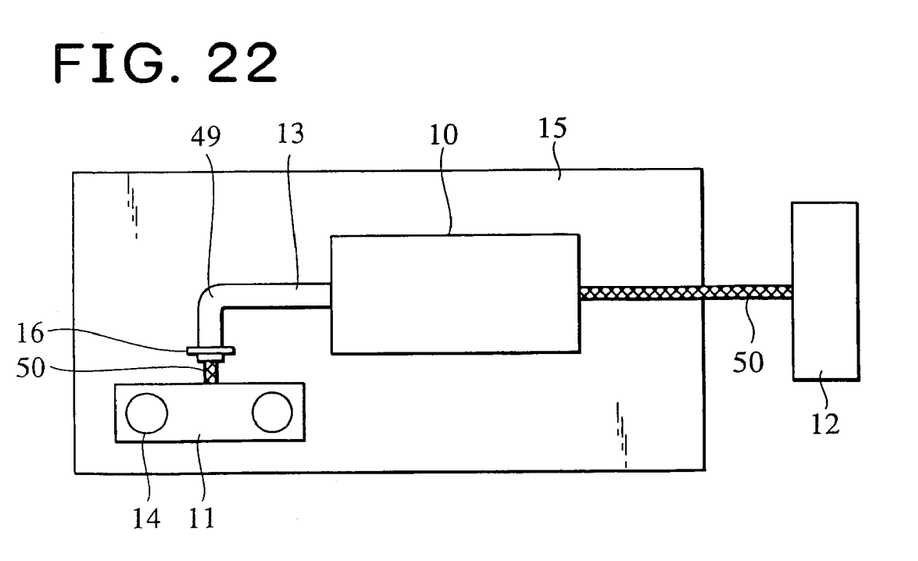
FIG. 22 is an arrangement plan showing an embodiment where the outer cable position of the initial tension device is changed.

The initial tension device 10 of the present invention can be set in principle wherever the wire cable 13 is arranged. Furthermore, the outer cable 49 to which the insertion part 17 is fixed can also be arranged between the initial tension device 10 and the drive device 11 as shown in FIG. 22.

In FIGS. 23 to 28, a powered slide unit 60 as a typical example of the drive unit 11 and a slide door 61 as a typical example of the movable member 12 are shown. A base plate 62 of the powered slide unit 60 is fixed to a vehicle body 63 equivalent to the immovable member 15, and to the base plate 62, a motor 64, a reduction mechanism 65, and a wire drum 66 are provided.

Figure 23:
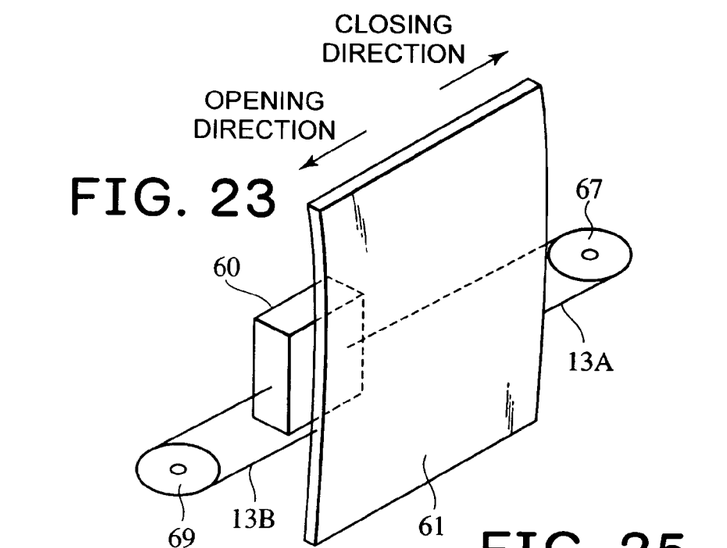
FIG. 23 is a perspective illustration showing the relation between a slide door and a powered slide unit.
Figure 24:
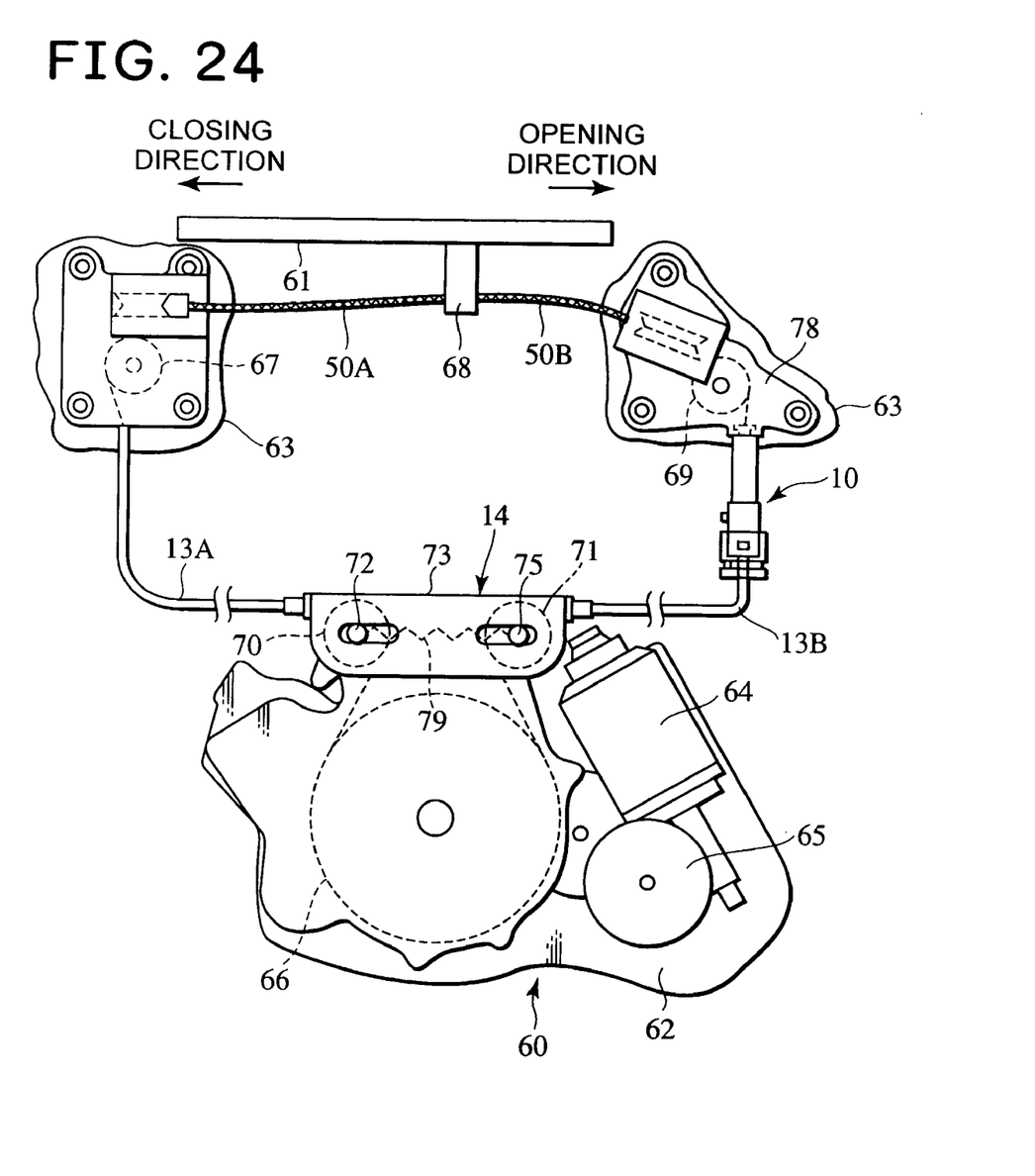
FIG. 24 is an expansion plan showing the relation between the slide door and the powered slide unit.

To the wire drum 66, one end sides of two wire cables 13A, 13B are connected. The other end side of the wire cable 13A is connected to a bracket 68 of the slide door 61 through a front pulley 67 pivoted to the vehicle body 63. Similarly, the other end side of the wire cable 13B is connected to the bracket 68 through a rear side pulley 69 pivoted to the vehicle body 63. When the wire drum 66 rotates counterclockwise, the wire cable 13A is wound up, and at the same time, the wire cable 13B is pulled out, and the slide door 61 slides in the closing direction. When the wire drum 66 rotates counterclockwise, the slide door 61 slides in the opening direction. Two wire cables 13A, 13B arranged like a circle are regarded as one wire cable 13.

The secondary tension mechanism 14 is attached to the base plate 62. The initial tension device 10 is preferably provided between the secondary tension mechanism 14 and the rear side pulley 69.

Figure 25:
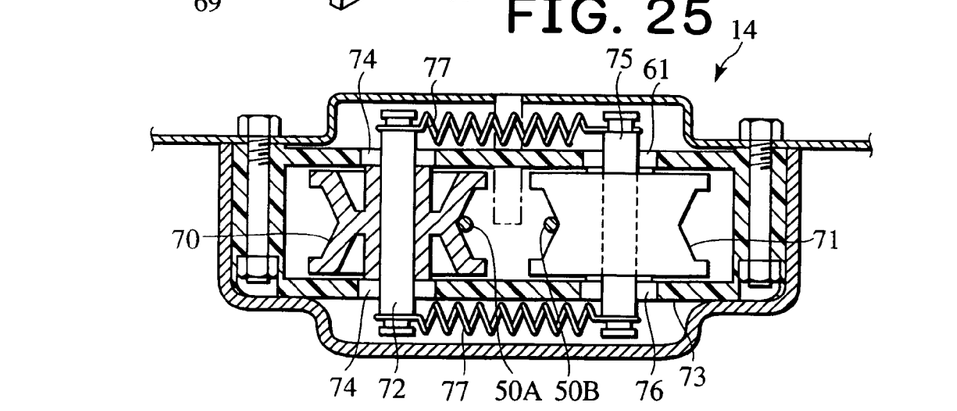
FIG. 25 is a cross sectional view of a secondary tension mechanism of the powered slide unit.
Figure 26:
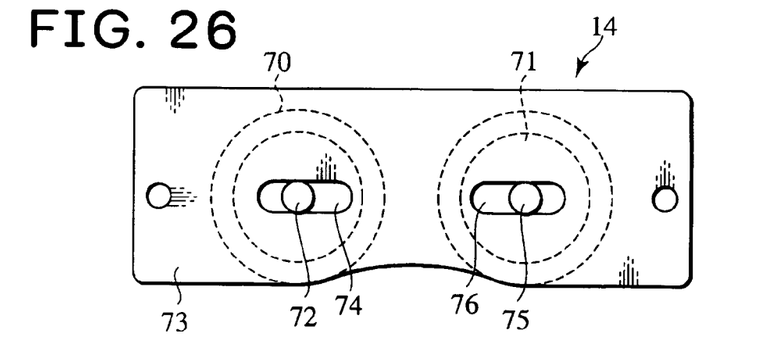
FIG. 26 is a plan view of a case of the secondary tension mechanism.

A typical example of the secondary tension mechanism 14 is shown in FIGS. 25 and 26. The secondary tension mechanism 14 shown here is described in detail in U.S. Pat. No. 6,198,242. The secondary tension mechanism 14 has a tension roller 70 coming into contact with the inner cable 50A of the wire cable 13A and a tension roller 71 coming into contact with the inner cable 50B of the wire cable 13B. A tension shaft 72 of the roller 70 is slidably attached to a slot 74 of a tension case 73, and a tension shaft 75 of the roller 71 is slidably attached to a slot 76 of the case 73. Between the shafts 72 and 75, a secondary tension spring 77 for making the roller 70 and the roller 71 go close to each other is provided. The slack in use of the wire cable 13 to which the initial tension is applied is absorbed by making the roller 70 and the roller 71 go close to each other by the elasticity of the secondary tension spring 77.

It is reasonable to attach the initial tension device 10 to a bracket 78 to which the rear side pulley 69 is attached.

When performing the initial set-up of the wire cable, as mentioned above, the insertion part 17 of the initial tension device 10 is deeply inserted into the second space 23 of the base case 19, so that the wire cable is loosened. In addition to this work, if the function of the secondary tension spring 77 of the secondary tension mechanism 14 is stopped, the initial set-up of the wire cable can more easily be performed.

Figure 27:
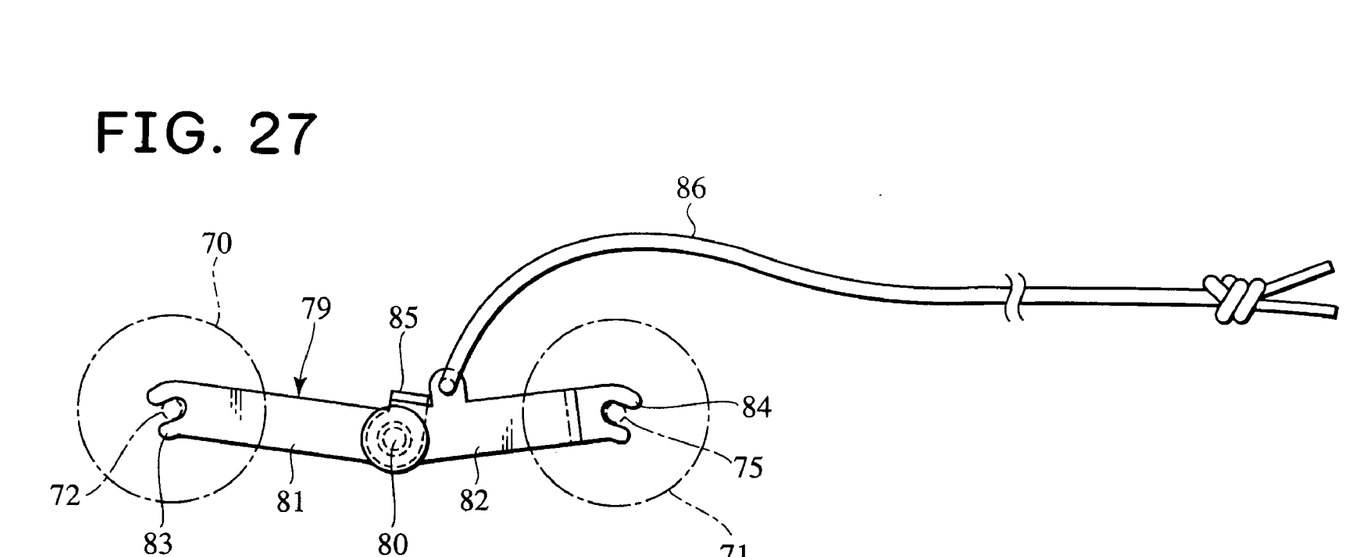
FIG. 27 is a side view of an initial set-up jig of a wire cable.
Figure 28:
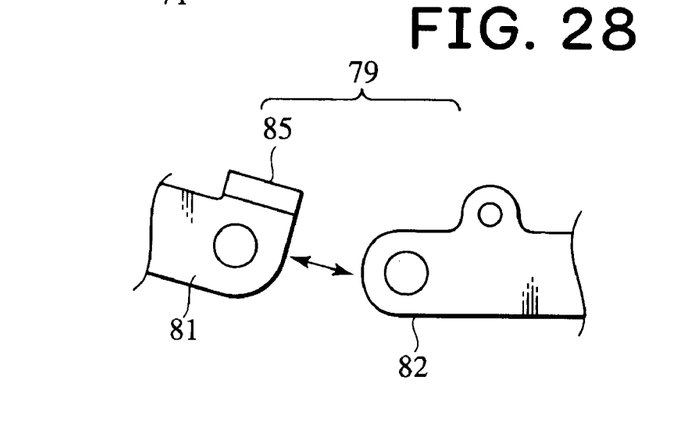
FIG. 28 is a partial expanded figure of the jig.

In FIGS. 27 and 28, a set-up jig 79 for making the elasticity of the secondary tension spring 77 of the secondary tension mechanism 14 invalid is shown. The jig 79 has a pair of arms 81, 82 which are pivoted to each other by a connecting shaft 80. The arms 81, 82 have grooves 83, 84 to be engaged with the tension shafts 72, 75 at the tips thereof, respectively. The arm 81 has a bent part 85 which can came into contact with the side of the arm 82.

In order to make the elasticity of the secondary tension spring 77 invalid by the set-up jig 79, first, the groove 83 of the arm 81 is engaged with the tension shaft 72, and the groove 84 of the arm 82 is engaged with the tension shaft 75. In this state, if the center part of the jig 79 is pushed so that the arm 81 and the arm 82 become horizontal, both arms 81, 82 are gradually widened, and the tension shafts 72, 75 are gradually separated from each other against the elasticity of the secondary tension spring 77. Then, when the arms 81, 82 are widened as shown in FIG. 27 exceeding the horizontal state, the bent part 85 of the arm 81 comes into contact with the side of the arm 82. When this state is made, even if the force pushing the center part of the jig 79 is released, both arms 81, 82 keep the attitudes thereof, and accordingly, the secondary tension mechanism 14 (inner cable) becomes in the state of being loosened to the maximum.

At the center part of the jig 79, a removing string 86 is attached, and the tip of the removing string 86 is arranged at a place suitable for the work. When the initial set-up of the wire cable 13 is finished, the jig 79 is easily removed from the secondary tension mechanism 14 by pulling the removing string 86, and after that, as mentioned above, a proper initial tension is applied to the inner cable 50 by the initial tension device 10.

What is claimed is:

1. A device which applies an initial tension to a wire cable which transmits driving power of a drive unit to a movable member, comprising:
    a tension case adapted to be fixed to a vehicle body, said tension case having an elongated space along a longitudinal direction of the wire cable;
    an insertion part connected to an end part of an outer cable of the wire cable and inserted into the elongated space;
    a first retainer having an inside part engageable with the insertion part in a plane transverse to the longitudinal direction of the wire cable, first slots above the inside part and second slots above the first slots; and
    a two-stage slot formed in the tension case and extending in the longitudinal direction of the wire cable, said two-stage slot having a wide slot and a narrow slot corresponding in width with a width of a portion of the first retainer disposed between the second slots;
    wherein the wide slot and the narrow slot are coplanar so that a front end of the narrow slot communicates with the wide slot;
    wherein in a first position of said first retainer said first retainer is held out of engagement with the insertion part and the first slots are engaged with edges of the wide slot so as to permit the wire cable to be tensioned to a selected tension;
    wherein the first retainer is moved from the first position to a second position by moving said first retainer down in said wide slot into engagement with the insertion part and moving, said first retainer in the tension case parallel to the longitudinal direction of the wire cable to engage the second slots with edges of the narrow slot.

2. The device according to claim 1, wherein said first retainer is engaged with the insertion part when the wire cable is at the selected tension.

3. The device according to claim 1, wherein said first retainer comprises an inclined projection engaged with the edges of the wide slot to keep the first retainer at the first position where the first retainer is disengaged from the insertion part.

4. The device according to claim 1, further comprising a clearance provided in the tension case, and a second retainer inserted into the clearance.

5. The device according to claim 4, wherein said second retainer is engaged with a rear end part of the insertion part when said second retainer is inserted into the clearance.

6. The device according to claim 1, wherein upper edges of the first slots are formed by projections which permit the first retainer to be moved down into engagement with the insertion part.

\* \* \* \* \*